(12) United States Patent
Kim et al.

(10) Patent No.: US 12,315,971 B2
(45) Date of Patent: May 27, 2025

(54) MULTI-FUEL CELL SYSTEM AND CONTROL METHOD THEREOF

(71) Applicants: Hyundai Motor Company, Seoul (KR); Kia Corporation, Seoul (KR)

(72) Inventors: Jun Young Kim, Gumi-si (KR); Jun Young Park, Suwon-si (KR); Kyu Il Lee, Yongin-si (KR); Min Su Kang, Paju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 443 days.

(21) Appl. No.: 18/049,339

(22) Filed: Oct. 25, 2022

(65) Prior Publication Data
US 2023/0299317 A1 Sep. 21, 2023

(30) Foreign Application Priority Data
Mar. 17, 2022 (KR) .................. 10-2022-0033527

(51) Int. Cl.
| | | |
|---|---|---|
| H01M 8/04223 | (2016.01) | |
| H01M 8/04082 | (2016.01) | |
| H01M 8/04119 | (2016.01) | |
| H01M 8/04225 | (2016.01) | |
| H01M 8/04302 | (2016.01) | |
| H01M 8/04746 | (2016.01) | |
| H01M 8/04858 | (2016.01) | |

(52) U.S. Cl.
CPC ... *H01M 8/04253* (2013.01); *H01M 8/04126* (2013.01); *H01M 8/04201* (2013.01); *H01M 8/04225* (2016.02); *H01M 8/04268* (2013.01); *H01M 8/04302* (2016.02); *H01M 8/04753* (2013.01); *H01M 8/04932* (2013.01)

(58) Field of Classification Search
CPC ......... H01M 8/04253; H01M 8/04268; H01M 8/04223; H01M 8/04225; H01M 8/04302; H01M 8/04126; H01M 8/04201; H01M 8/04753; H01M 8/04932; H01M 8/0494
See application file for complete search history.

(56) References Cited

U.S. PATENT DOCUMENTS

| | | | | |
|---|---|---|---|---|
| 2017/0338500 A1* | 11/2017 | Pryor | .................... | H01M 8/241 |
| 2020/0328438 A1* | 10/2020 | Joos | .................. | H01M 8/04303 |
| 2023/0290966 A1* | 9/2023 | Arya | ....................... | B60L 1/003 |

FOREIGN PATENT DOCUMENTS

KR 101782353 B1 9/2017

* cited by examiner

*Primary Examiner* — Christopher P Domone
(74) *Attorney, Agent, or Firm* — MCDONNELL BOEHNEN HULBERT & BERGHOFF LLP

(57) ABSTRACT

Disclosed is a multi-fuel cell system and control method thereof in which when a plurality of fuel cell units electrically connected to each other, each including a fuel cell, an air compressor, and a humidifier, is cold-started, a first fuel cell unit, one of the plurality of fuel cell units, generates power in a defrost mode, an air compressor of a second fuel cell unit, another fuel cell unit, is driven by providing the power generated by the first fuel cell unit to the second fuel cell unit, and the first fuel cell unit generates power in a heating mode and the second fuel cell unit generates power in the defrost mode when the defrosting of the first fuel cell unit is completed.

13 Claims, 8 Drawing Sheets

MULTI-FUEL CELL SYSTEM AND CONTROL METHOD THEREOF

CROSS REFERENCE TO RELATED APPLICATIONS

The present application claims priority to Korean Patent Application No. 10-2022-0033527, filed Mar. 17, 2022, the entire contents of which is incorporated herein for all purposes by this reference.

TECHNICAL FIELD

The present disclosure relates to a multi-fuel cell system and a control method thereof. Specifically, when a plurality of fuel cell units sequentially enters cold start stage, power generated from one fuel cell unit is transmitted to another electrically connected fuel cell unit, and the humidifier is first defrosted before operation of the fuel cell unit, thereby improving the startability and durability of fuel cell vehicles during cold start.

BACKGROUND

A fuel cell converts thermal energy into electrical energy using a chemical reaction between supplied hydrogen and oxygen. At the anode (oxidation electrode) of the fuel cell, hydrogen, which is fuel, is oxidized to generate hydrogen ions and electrons. The hydrogen ions of the anode pass through the electrolyte membrane in the fuel cell and move to the cathode (reduction electrode). The mitigated hydrogen ions meet oxygen present in the cathode to produce water. At this time, the electrons do not penetrate the electrolyte membrane and generate electric energy while moving through the external conductor connecting the anode and the cathode.

A fuel cell vehicle requires a certain level of fuel cell output for driving. Fuel cells are supplied with hydrogen, which is fuel, and oxygen, and generate electrical energy as much as necessary. However, in a state in which the fuel cell is left in a low-temperature or cryogenic environment for a long time, if the vehicle is started to require the output of the fuel cell, residual moisture inside the fuel cell condenses, and the target output of the fuel cell becomes impossible. In order to solve this problem, the vehicle can be started by entering a cold start stage, which is a different startup method from a normal startup.

When entering the cold start stage, the fuel cell starts generating power to increase the amount of heat generated by the fuel cell, and when the fuel cell starts generating power, it outputs a high amount of power. The power generated by the power generation of the fuel cell is consumed through resistors around the fuel cell or used to charge a high voltage battery. However, there is a problem in that the battery performance of the fuel cell vehicle is deteriorated in a low temperature or cryogenic environment, so that the battery cannot be charged with the output power of the fuel cell. Therefore, most of the power generated during the cold start process was transmitted to the resistors and consumed as the resistors heat up. However, in the case of a fuel cell vehicle composed of a plurality of fuel cells, the amount of power generated when all fuel cells enter the cold start stage at the same time is greater than the amount of power generated when a single fuel cell enters the cold star stage. Accordingly, the consumption of the large amount of power generated when multiple fuel cells enter cold start stage by the resistors has a problem of lowering the efficiency of cold start.

The matters described as the background art above are only for improving the understanding of the background of the present disclosure, and should not be taken as acknowledging that they correspond to the prior art already known to those of ordinary skill in the art.

SUMMARY

The present disclosure has been proposed to solve this problem, and is to provide a multi-fuel cell system and control method thereof in which when a plurality of fuel cell units sequentially enters cold start stage, an air compressor of another fuel cell unit is driven with the power generated from one fuel cell unit to defrost a humidifier, so that the cold-startability of a fuel cell vehicle is improved.

In order to achieve the above object, a multi-fuel cell system according to the present disclosure includes a plurality of fuel cell units electrically connected to each other and each including a fuel cell, an air compressor, and a humidifier; and a controller that causes a first fuel cell unit, one of the plurality of fuel cell units, to generate power in a defrost mode when the plurality of fuel cell units is cold-started, drives an air compressor of a second fuel cell unit, another fuel cell unit, by providing power generated by the first fuel cell unit to the second fuel cell unit, and causes the first fuel cell unit to generate power in a heating mode and the second fuel cell unit to generate power in the defrost mode when the defrosting of the first fuel cell unit is completed.

The controller may cause the fuel cell unit to generate a higher output in the defrost mode than in the heating mode.

The humidifier of the fuel cell unit may introduce air from the air compressor through an air inlet line, supply the air to the fuel cell through an air supply line, introduce air after reaction from the fuel cell through an air recovery line, and discharge the air to an outside through an exhaust line.

A bypass line connecting the air supply line and the air recovery line may be provided, and a three-way valve may be provided at a point where the air supply line and the bypass line intersect.

When the first fuel cell unit generates power in the defrost mode or the heating mode, the controller may cause the three-way valve to close the bypass line, and when the air compressor of the second fuel cell unit is driven, the controller may cause the three-way valve to open the closed bypass line so that the air is not supplied to the fuel cell.

When the air compressor of the second fuel cell unit is driven, the air introduced to the humidifier through the air inlet line may be supplied through the air supply line, move to the bypass line without being supplied to the fuel cell due to the three-way valve, and be transmitted back to the humidifier through the air recovery line.

In order to achieve the above object, a control method of a multi-fuel cell system according to the present disclosure includes the steps of causing a first fuel cell unit, one of a plurality of electrically connected fuel cell units, to generate power in a defrost mode by a controller when the plurality of fuel cell units is cold-started; driving an air compressor of a second fuel cell unit, another fuel cell unit, by providing power generated by the first fuel cell unit to the second fuel cell unit, by the controller; and causing the first fuel cell unit to generate power in a heating mode and the second fuel cell unit to generate power in the defrost mode by the controller when the defrosting of the first fuel cell unit is completed.

In the step of causing the first fuel cell unit to generate power in the defrost mode, the controller may supply air to a fuel cell of the first fuel cell unit by driving an air compressor of the first fuel cell unit using the power generated by the first fuel cell unit.

In the step of causing the first fuel cell unit to generate power in the defrost mode, when the power generated by the first fuel cell unit is provided to the second fuel cell unit, the controller may operate a converter connected to the first fuel cell unit in a buck mode.

In the step of driving the air compressor of the second fuel cell unit, when the power generated by the first fuel cell unit is provided to the second fuel cell unit, the controller may operate a converter connected to the second fuel cell unit in a boost mode.

In the step of driving the air compressor of the second fuel cell unit, the controller may not transmit the power provided from the first fuel cell unit to a fuel cell of the second fuel cell unit.

In the step of driving the air compressor of the second fuel cell unit, the controller may drive the air compressor of the second fuel cell unit with the power supplied from the first fuel cell unit to defrost a humidifier of the second fuel cell unit.

In the step of causing the second fuel cell unit to generate power in the defrost mode, the controller may provide the power generated by the second fuel cell unit to the air compressor of the first fuel cell unit that generates power in the heating mode.

According to the multi-fuel cell system and the control method thereof of the present disclosure, when a plurality of fuel cell units enters a cold start stage, the power generated by one of the fuel cell units is used to drive the air compressor of electrically connected other fuel cell to defrost the humidifier of the fuel cell unit in advance. Accordingly, it is possible to prevent excessive output and shorten the cold start completion time when the fuel cell unit enters the cold start stage.

In addition, by using the power generated from one fuel cell unit to defrost the humidifier of another electrically connected fuel cell unit before entering the cold start stage, stable cold-start performance can be secured even if the charging efficiency is reduced due to the degradation of a high voltage battery in a low temperature or cryogenic environment.

DETAILED DESCRIPTION

Figure 1:
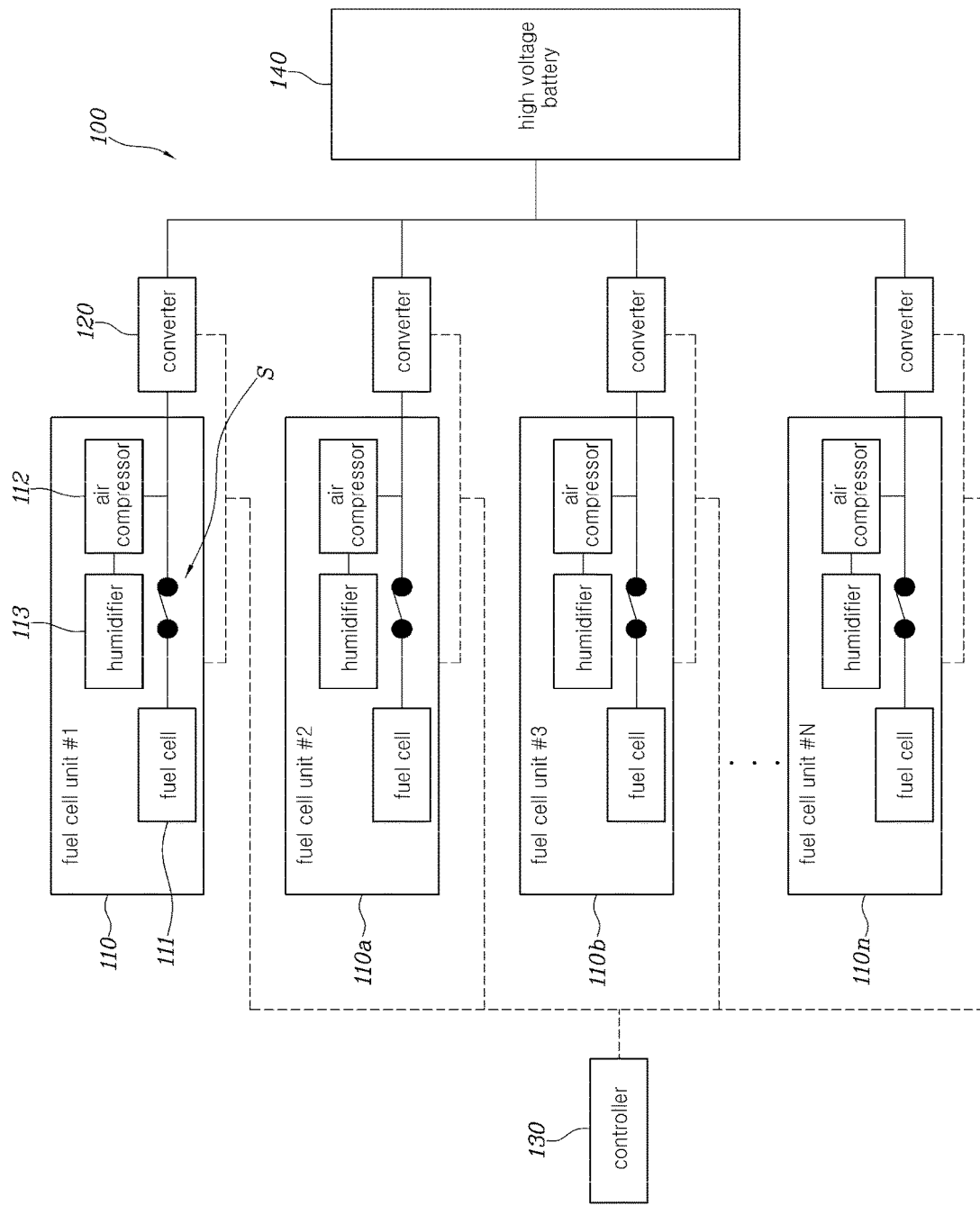
FIG. 1 is a block diagram of a multi-fuel cell system according to an embodiment of the present disclosure.
Figure 2:
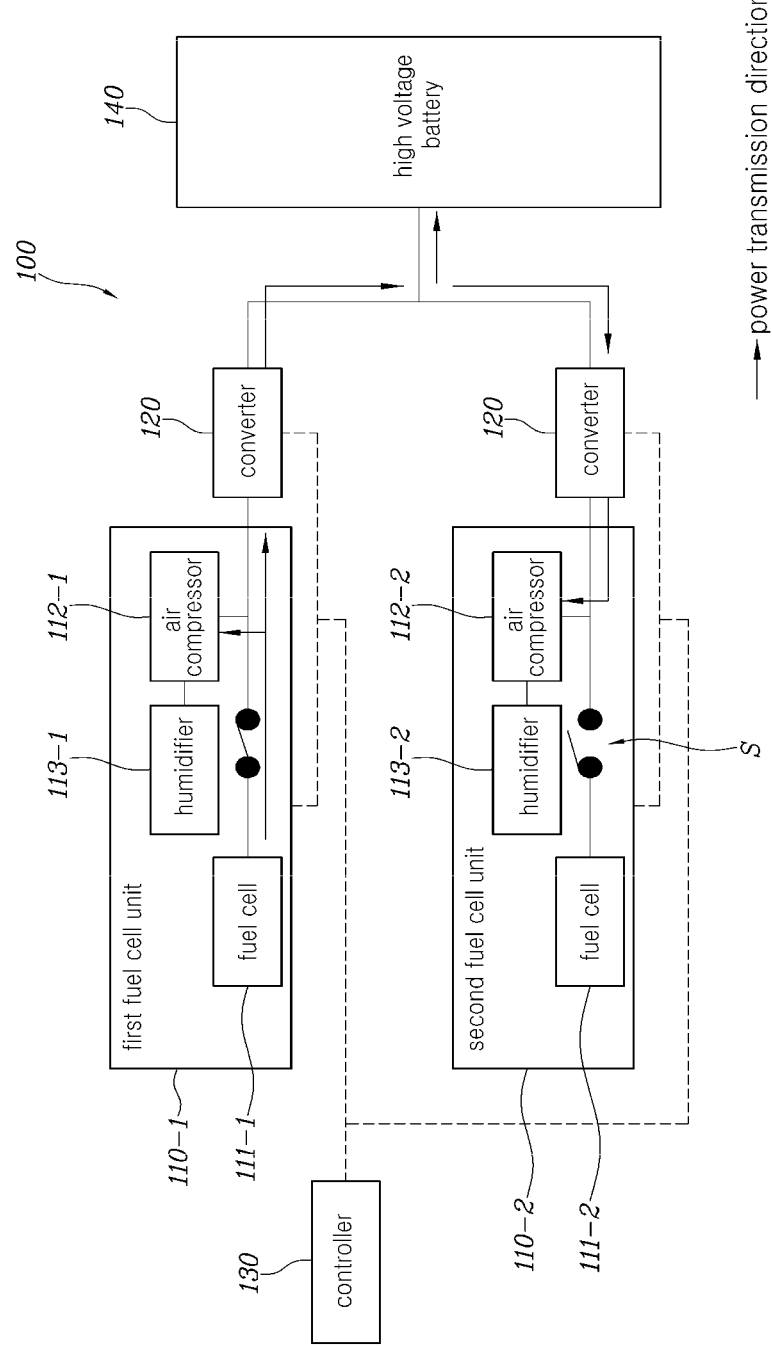
FIG. 2 is a diagram showing power flow generated in a defrost mode of a first fuel cell unit according to an embodiment of the present disclosure.
Figure 3:
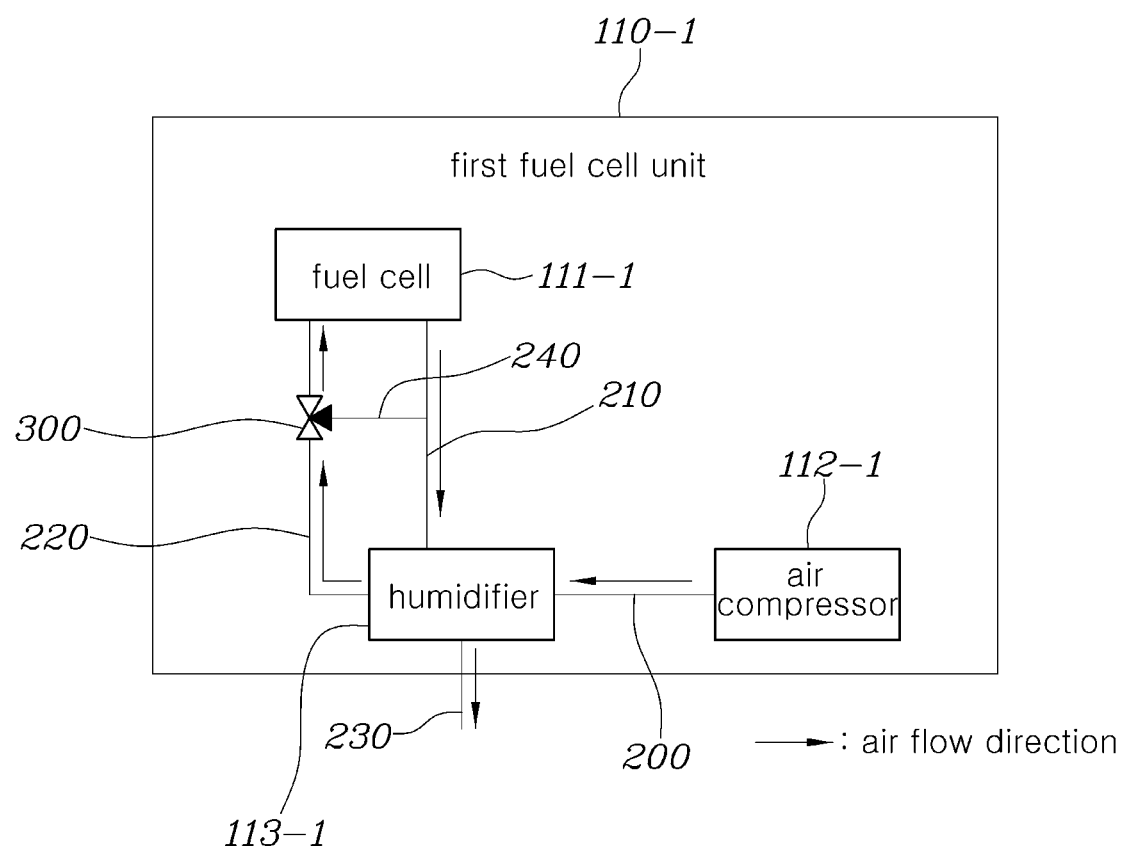
FIG. 3 is a diagram showing air flow when a first fuel cell unit generates power in a defrost mode or a heating mode according to an embodiment of the present disclosure.
Figure 4:
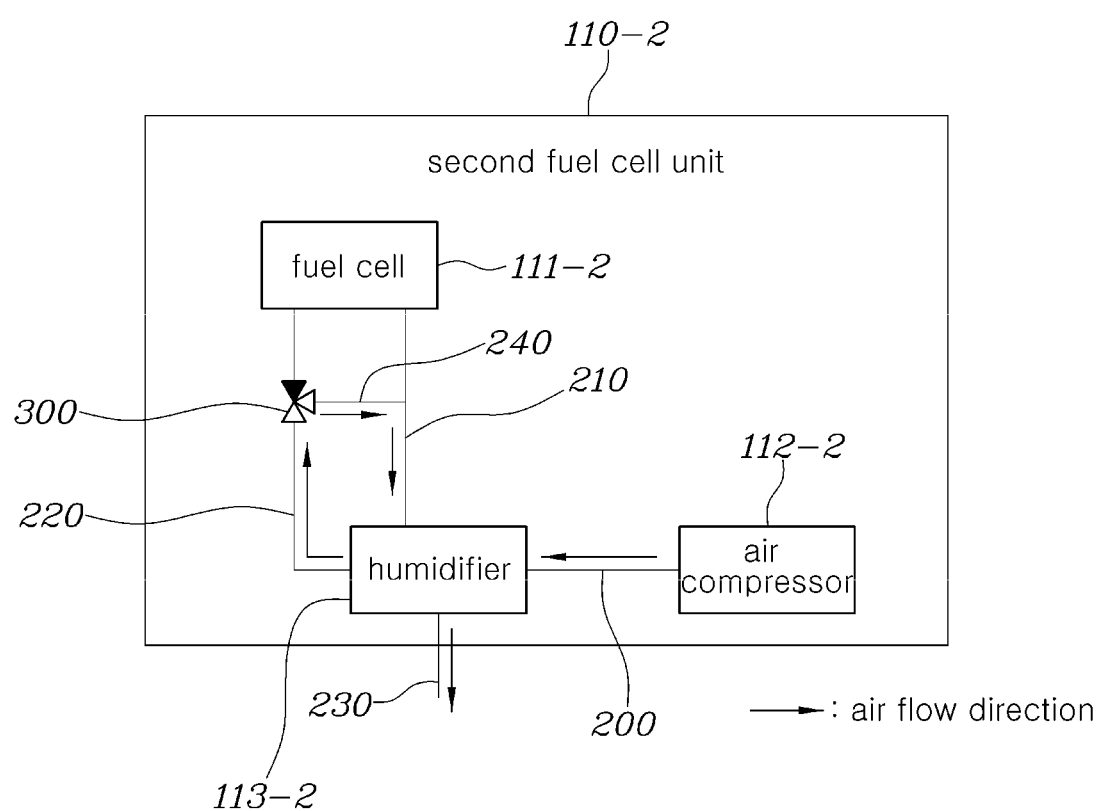
FIG. 4 is a diagram showing air flow when an air compressor of a second fuel cell unit is driven according to an embodiment of the present disclosure.
Figure 5:
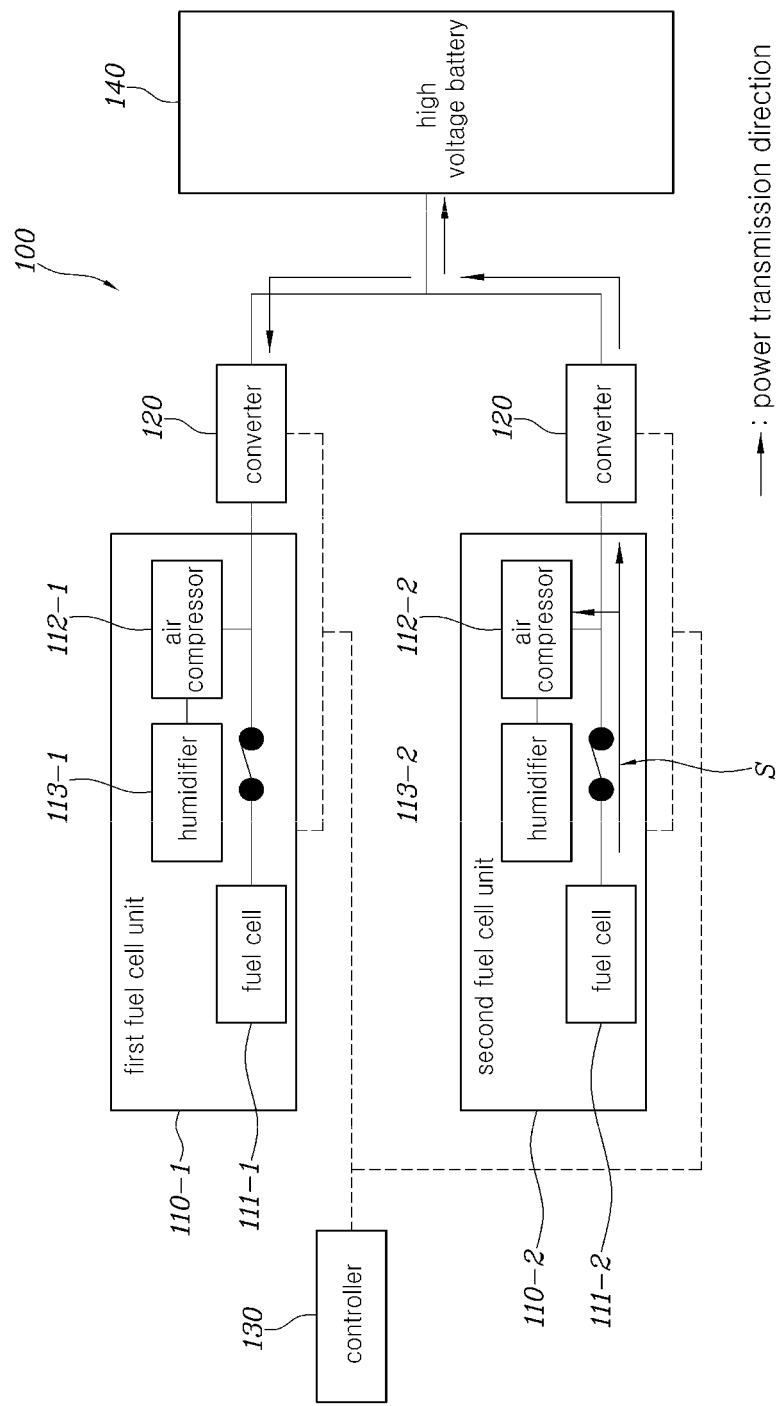
FIG. 5 is a diagram showing power flow generated in a heating mode of a first fuel cell unit and a defrost mode of a second fuel cell unit according to an embodiment of the present disclosure.
Figure 6:
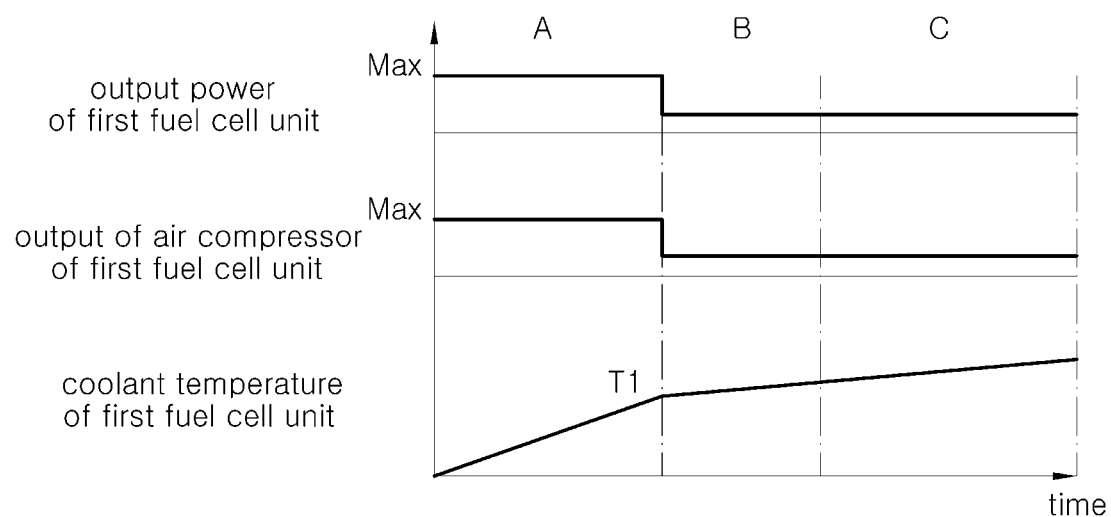
FIG. 6 is a graph of data change over time of a first fuel cell unit according to an embodiment of the present disclosure.
Figure 7:
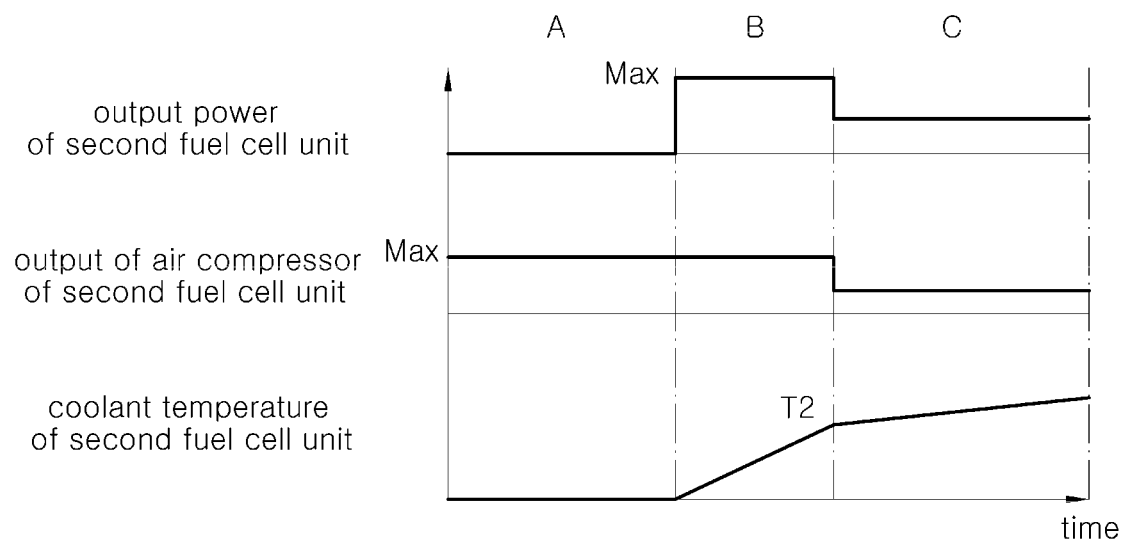
FIG. 7 is a graph of data change over time of a second fuel cell unit according to an embodiment of the present disclosure.
Figure 8:
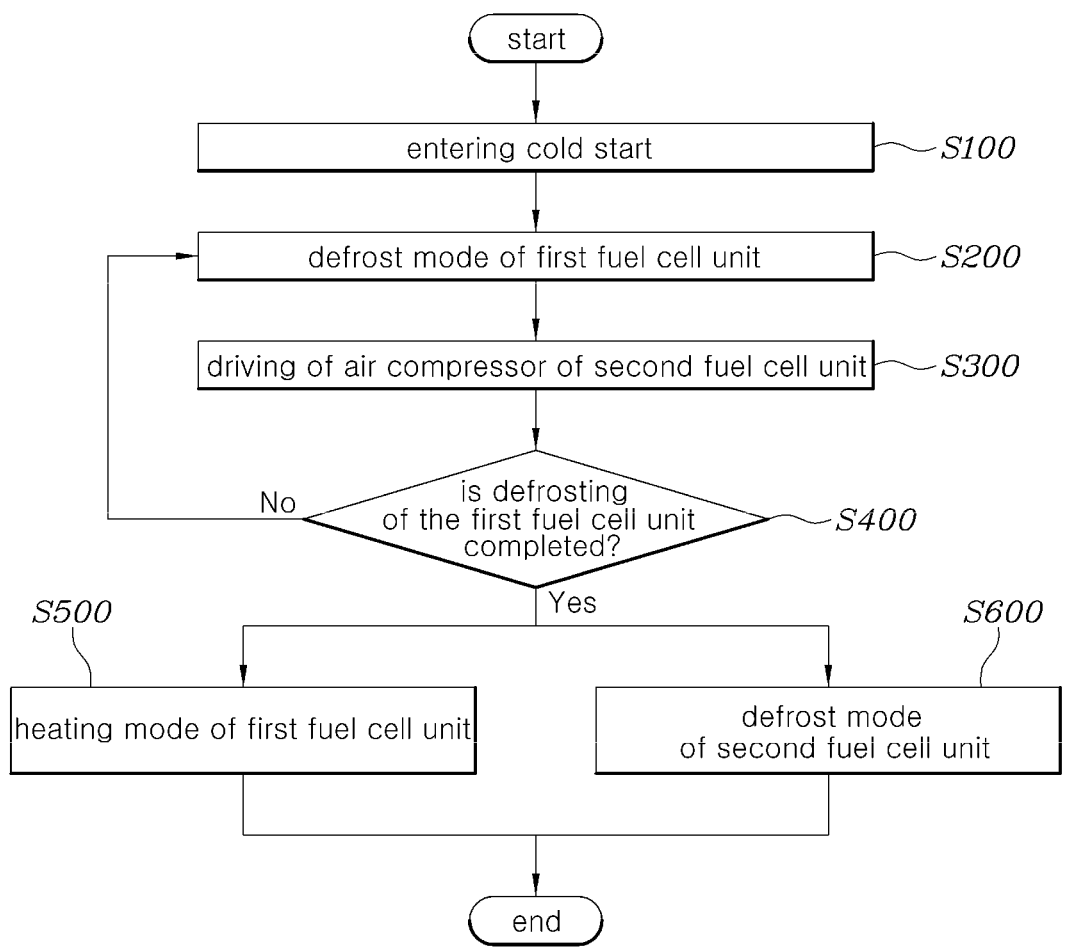
FIG. 8 is a flowchart of a control method of a multi-fuel cell system according to an embodiment of the present disclosure.

FIG. 1 is a block diagram of a multi-fuel cell system according to an embodiment of the present disclosure, FIG. 2 is a diagram showing power flow generated in a defrost mode of a first fuel cell unit according to an embodiment of the present disclosure, FIG. 3 is a diagram showing air flow when a first fuel cell unit generates power in a defrost mode or a heating mode according to an embodiment of the present disclosure, FIG. 4 is a diagram showing air flow when an air compressor of a second fuel cell unit is driven according to an embodiment of the present disclosure, FIG. 5 is a diagram showing power flow generated in a heating mode of a first fuel cell unit and a defrost mode of a second fuel cell unit according to an embodiment of the present disclosure, FIG. 6 is a graph of data change over time of a first fuel cell unit according to an embodiment of the present disclosure, FIG. 7 is a graph of data change over time of a second fuel cell unit according to an embodiment of the present disclosure, FIG. 8 is a flowchart of a control method of a multi-fuel cell system according to an embodiment of the present disclosure.

FIG. 1 is a block diagram of a multi-fuel cell system according to an embodiment of the present disclosure. The multi-fuel cell system 100 of the present disclosure includes a plurality of fuel cell units 110, 110a, 110b, . . . , 110n electrically connected to each other and each including a fuel cell 111, an air compressor 112, and a humidifier 113; and a controller 130 that causes one of the fuel cell units 110, 110a, 110b, . . . , 110n to generate power in a defrost mode when the plurality of fuel cell units 110, 110a, 110b, . . . , 110n is cold-started, drives the air compressor 112-2 of the second fuel cell unit by providing the power generated by the first fuel cell unit 110-1 to the second fuel cell unit 110-2, which is another fuel cell unit, causes the first fuel cell unit 110-1 to generate power in a heating mode and the second fuel cell unit 110-2 to generate power in the defrost mode when the defrosting of the first fuel cell unit 110-1 is completed.

The controller 130 according to the exemplary embodiment of the present may be implemented by a non-volatile memory (not shown) configured to store an algorithm configured to control the operation of various components of a vehicle or data regarding the software commands for reproducing the algorithm, and a processor (not shown) configured to perform operations described below using the data stored in the memory. Here, the memory and the processor may be implemented as separate chips. Alternatively, the memory and processor may be implemented as a single chip integrated with each other, and the processor may take the form of one or more processors.

The multi-fuel cell system 100 of FIG. 1 is composed of a plurality of fuel cell units 110, 110a, 110b, . . . , 110n, which is electrically connected to each other. Each of the fuel cell units 110, 110a, 110b, . . . , 110n includes the fuel cell 111, the air compressor 112, and the humidifier 113. When the fuel cell unit 110 generates power, the fuel cell 111 generates power. The fuel cell 111 and the air compressor 112 are electrically connected to transmit the power generated by the fuel cell 111 to the air compressor 112. At this time, a switch S is provided between the fuel cell 111 and the air compressor 112. Whether or not the power required to drive the air compressor 112 of the fuel cell unit 110 is provided can be checked through whether the switch S is connected. In addition, the plurality of fuel cell units 110, 110a, 110b, ..., 110n is connected to a high voltage battery 140. The power generated by the plurality of fuel cell units 110, 110a, 110b, ..., 110n is used to charge the high voltage battery 140.

When the multi-fuel cell system 100 enters the cold start stage, the plurality of fuel cell units 110, 110a, 110b, ..., 110n each generates power to increase the temperature of the fuel cell 111, and power generation generates a lot of power. At this time, the output power is mainly used to charge the high voltage battery 140 or is consumed by peripheral resistors. However, in a low or cryogenic environment, the high voltage battery 140 has a low allowable charge amount, and there is a problem in that the amount of charge of the high voltage battery 140 is small compared to the power output from the power generation of the plurality of fuel cell units 110, 110a, 110b, ..., 110n. Accordingly, when the multi-fuel cell system 100 enters the cold start stage, the power output from the plurality of fuel cell units 110, 110a, 110b, ..., 110n is mostly consumed by the peripheral resistor. However, when the power output during cold start is consumed by the peripheral resistors, there is a problem in that the efficiency of cold start is reduced.

Accordingly, the multi-fuel cell system 100 is provided with the controller 130 to control the plurality of fuel cell units 110, 110a, 110b, ..., 110n to sequentially enter the cold start stage. By controlling the plurality of fuel cell units 110, 110a, 110b, ..., 110n to sequentially enter the cold start stage, the total power output when the plurality of fuel cell units 110, 110a, 110b, ..., 110n enters the cold start stage is reduced. Accordingly, there is an effect of preventing excessive output of the multi-fuel cell system 100. In addition, the controller 130 operates the converter 120 respectively connected to the plurality of fuel cell units 110, 110a, 110b, ..., 110n in a buck mode or a boost mode to facilitate the provision of power between the fuel cell units 110. When the plurality of fuel cell units 110, 110a, 110b, ..., 110n sequentially enters the cold start stage, the controller 130 transmits the power generated in one fuel cell unit 110 to the next fuel cell unit 110 entering the cold start stage while not being consumed by the resistors. The controller 130 causes the fuel cell unit 110 receiving power to drive the air compressor 112 to defrost the humidifier 113 in advance before entering the cold start. Thereafter, when the fuel cell unit 110 enters the cold start stage, the humidifier 113 is defrosted in advance, thereby reducing the time until the cold start of the fuel cell unit 110 is completed. Accordingly, it is possible to secure stable and fast startability when the multi-fuel cell system 100 enters a cold start stage in a low temperature or cryogenic environment.

The plurality of fuel cell units 110, 110a, 110b, ..., 110n of the present disclosure is a multi-fuel cell system 100 composed of two or more fuel cell units 110. When the first fuel cell unit 110-1, which is one of the plurality of fuel cell units 110, 110a, 110b, ..., 110n, enters the cold start stage, the process occurring in the first fuel cell unit 110-1 and the second fuel cell unit 110-2, which is another fuel cell unit 110 electrically connected thereto, occurs equally in the plurality of fuel cell units 110, 110a, 110b, ..., 110n. Accordingly, in the multi-fuel cell system 100 according to an embodiment of the present disclosure, the first fuel cell unit 110-1 and the second fuel cell unit 110-2 become the core components.

Hereinafter, the first fuel cell unit 110-1 and the second fuel cell unit 110-2 of the multi-fuel cell system 100 will be mainly described.

FIG. 2 is a diagram showing power flow generated in a defrost mode of a first fuel cell unit according to an embodiment of the present disclosure. When the multi-fuel cell system 100 enters a cold start stage, the controller 130 does not cause the plurality of fuel cell units 110, 110a, 110b, ..., 110n to simultaneously enter the cold start stage, and but cases one fuel cell unit 110 from the fuel cell units 110, 110a, 110b, ..., 110n to enter the cold start stage. In this case, the controller 130 causes the fuel cell unit 110 to generate power by maintaining the output in the defrost mode higher than the output in the heating mode. The defrost mode of the fuel cell unit 110 corresponds to a state immediately after the fuel cell unit 110 enters the cold start stage, and the fuel cell unit 110 needs to generate sufficient power. However, the heating mode is a process after the defrosting of the fuel cell unit 110 is completed, and corresponds to a state in which the fuel cell unit 110 is heated to some extent. Therefore, the fuel cell unit 110 needs to generate power at a higher output in the defrost mode than in the heating mode in order to defrost the fuel cell unit 110.

When the first fuel cell unit 110-1 enters the cold start stage, the controller 130 causes the first fuel cell unit 110-1 to generates power in the defrost mode. The first fuel cell unit 110-1 generates power through power generation, and the generated power operates the air compressor 112-1 of the first fuel cell unit to supply air to the fuel cell 111-1 of the first fuel cell unit. Then, the power generated by the first fuel cell unit 110-1 charges the high voltage battery 140 connected to the plurality of fuel cell units 110, 110a, 110b, ..., 110n. However, when the high voltage battery 140 is charged in a state in which it is left in a low temperature or cryogenic environment for a long time, there is a problem that the charging efficiency decreases. Accordingly, it is inefficient to use the power generated by the first fuel cell unit 110-1 for defrosting only the first fuel cell unit 110-1 and charging the high voltage battery 140. Accordingly, the controller 130 needs to provide some of the power generated by the first fuel cell unit 110-1 to the second fuel cell unit 110-2 which is another fuel cell unit 110.

In this case, the controller 130 needs to control the converter 120 provided in the multi-fuel cell system 100 in order to provide the power generated by the first fuel cell unit 110-1 to the other electrically connected fuel cell unit 110. The controller 130 operates the converter 120 connected to the first fuel cell unit 110-1 in the buck mode when the first fuel cell unit 110-1 generates power in the defrost mode. The power generated by the first fuel cell unit 110-1 may be provided to the second fuel cell unit 110-2, and may be provided to the high voltage battery 140 through a connected wire. When the generated power is provided to the high voltage battery 140 through the connected wire, it needs to step down the power generated by the first fuel cell unit 110-1 accordingly so that the high voltage battery 140 can be charged. Accordingly, the power generated by the first fuel cell unit 110-1 is stepped down through the converter 120 connected to the first fuel cell unit 110-1 and provided to the second fuel cell unit 110-2.

However, when the step-down power is provided to the second fuel cell unit 110-2 for charging the high voltage battery 140, there is a problem in that a desired output cannot be obtained from the second fuel cell unit 110-2. Accordingly, the controller 130 operates the converter 120 connected to the second fuel cell unit 110-2 in a boost mode when the first fuel cell unit 110-1 generates power in the defrost mode. Accordingly, the step-down power supplied from the first fuel cell unit 110-1 is boosted through the converter 120 connected to the second fuel cell unit 110-2 and provided to the second fuel cell unit 110-2.

Then, the controller 130 uses the power provided from the first fuel cell unit 110-1 to drive the air compressor 112-2 of the second fuel cell unit. At this time, in the second fuel cell unit 110-2, the switch S provided on the wire connecting the fuel cell 111-2 and the air compressor 112-2 is maintained in an open state so that the power provided to the second fuel cell unit 110-2 is not provided to the fuel cell 111-2 of the second fuel cell unit. Then, the controller 130 drives the air compressor 112-2 of the second fuel cell unit to defrost the humidifier 113-2 of the second fuel cell unit connected to the air compressor 112-2. When left in a low temperature or cryogenic environment for a long time, moisture remaining inside the humidifier 113 of the fuel cell unit is condensed. When the fuel cell unit 110 enters the cold start stage, the temperature of the air sucked into the fuel cell unit 110 is lowered due to moisture condensation inside the humidifier 113. In addition, there is a problem in that the time until the cold start stage is completed is delayed. Accordingly, in order to reduce the cold start completion time, it needs to defrost the condensed moisture inside the humidifier 113 provided in the fuel cell unit 110 in advance. Therefore, the humidifier 113-2 of the second fuel cell unit can be defrosted in advance by using the power provided from the first fuel cell unit 110-1 to drive the air compressor 112-2 of the second fuel cell unit. In addition, since the humidifier 113-2 of the second fuel cell unit is defrosted in advance, there is an effect that the time until the completion of the cold start is reduced when the second fuel cell unit 110-2 enters the cold start stage.

Meanwhile, FIGS. 3 to 4 show air flow inside the fuel cell unit according to an embodiment of the present disclosure. FIG. 3 is a diagram showing air flow when the first fuel cell unit generates power in a defrost mode or a heating mode according to an embodiment of the present disclosure, and FIG. 4 is a diagram showing air flow when the air compressor of the second fuel cell unit is driven according to an embodiment of the present disclosure. The humidifier 113 of the fuel cell unit is connected to an air inlet line 200 through which air is introduced from the air compressor 112, an air recovery line 210 through which excess air is introduced after reaction in the fuel cell 111, an air supply line 220 for supplying air to the fuel cell 111, and a discharge line 230 for discharging air to the outside. In addition, there is a bypass line 240 connecting the air supply line 220 and the air recovery line 210. In addition, a three-way valve 300 is provided at the point where the air supply line 220 and the bypass line 240 intersect. When the first fuel cell unit 110-1 generates power in the defrost mode or the heating mode, the controller 130 causes the three-way valve 300 to close the bypass line 240 as shown in FIG. 3. When the air compressor 112-2 of the second fuel cell is driven, the controller 130 causes the three-way valve 300 to open the closed bypass line 240, as shown in FIG. 4, so that air is not supplied to the fuel cell 111-2.

That is, the controller 130 controls the three-way valve 300 to control the flow of air inside the first fuel cell unit 110-1 or the second fuel cell unit 110-2. When the first fuel cell unit 110-1 of FIG. 3 generates power in the defrost mode or the heating mode, the air introduced into the humidifier 113-1 from the air compressor 112-1 is transmitted from the humidifier 113-1 to the fuel cell 111-1 through the air supply line 220. Thereafter, the air remaining after the reaction with hydrogen in the fuel cell 111-1 is transmitted to the humidifier 113-1 through the air recovery line 210 and discharged to the outside through the discharge line 230. Since the three-way valve 300 closes the bypass line 240, no air flow occurs in the bypass line 240. However, when the air compressor 112-2 of the second fuel cell unit of FIG. 4 is operated, air passes through the air compressor 112-2 and flows into the humidifier 113-2, and moves from the humidifier 113-2 to the fuel cell 111-2 along the air supply line 220. However, the air does not move to the fuel cell 111-2 but moves to the air recovery line 210 through the bypass line 240 due to the opening and closing of the three-way valve 300. Thereafter, the air transmitted to the humidifier 113-2 through the air recovery line 210 is discharged to the outside through the discharge line 230. Therefore, when the air compressor 112-2 for defrosting the humidifier 113-2 of the second fuel cell unit is driven, as shown in FIG. 4, an air flow occurs inside the second fuel cell unit 110-2, so that the condensed moisture inside the humidifier 113-2 ca be defrosted.

Meanwhile, FIG. 5 is a diagram showing power flow generated in a heating mode of the first fuel cell unit and a defrost mode of the second fuel cell unit according to an embodiment of the present disclosure. When the first fuel cell unit 110-1 generates power in the defrost mode and then the first fuel cell unit 110-1 finishes defrosting, the controller 130 controls the first fuel cell unit 110-1 to generate power in the heating mode. When the defrosting of the first fuel cell unit 110-1 is finished, the first fuel cell unit 110-1 does not need to continuously maintain high output. Therefore, it needs to generate power in the heating mode so that the first fuel cell unit 110-1 can complete the cold start while maintaining the output lower than that in the defrost mode. Also, when the defrosting of the first fuel cell unit 110-1 is finished, the controller 130 causes the second fuel cell unit 110-2 to generate power in the defrost mode. In this case, the switch S provided on the wire connecting the fuel cell 111-2 and the air compressor 112-2 in the second fuel cell unit 110-2 remains closed. Accordingly, the power generated by the fuel cell 111-2 of the second fuel cell unit can be provided to drive the air compressor 112 of the other fuel cell unit 110. Then, when the second fuel cell unit 110-2 generates power in the defrost mode, the controller 130 operates the converter 120 connected to the second fuel cell unit 110-2 in the buck mode. The power generated by the second fuel cell unit 110-2 passes through the converter 120 in the buck mode and the voltage is dropped, and is provided to the other electrically connected fuel cell unit 110 or the high voltage battery 140. In addition, the power generated by the second fuel cell unit 110-2 may be provided to the first fuel cell unit 110-1 that generates power in the heating mode. When the power generated by the second fuel cell unit 110-2 is provided to drive only the air compressor 112-2 of the fuel cell unit, the air compressor 112-2 is continuously driven and it may become an overdrive state. However, as the first fuel cell unit 110-1 generates power in the heating mode, the power generated is reduced, and the first fuel cell unit 110-1 can additionally receive power from the outside. Accordingly, the power generated by the second fuel cell unit 110-2 is also provided to the first fuel cell unit 110-1 that generates power in the heating mode, so there is an effect of preventing the air compressor 112-2 of the fuel cell unit from being overdriven.

FIGS. 6 and 7 are graphs illustrating changes in data output from the fuel cell unit over time. FIG. 6 is a graph of data change over time of a first fuel cell unit according to an embodiment of the present disclosure, and FIG. 7 is a graph of data change over time of a second fuel cell unit according to an embodiment of the present disclosure. In the graphs of FIGS. 6 to 7, A denotes a section in which the first fuel cell unit 110-1 generates power in the defrost mode, B denotes a section in which the first fuel cell unit 110-1 generates power in the heating mode, and C denotes a section in which the second fuel cell unit 110-2 generates power in the heating mode. In section A of FIG. 6, when the first fuel cell unit 110-1 generates power in the defrost mode after entering the cold start stage, the first fuel cell unit 110-1 is generated to output maximum power. In order to output the maximum power from the first fuel cell unit 110-1, the air compressor 112-1 of the first fuel cell unit is also driven with the maximum output. After section B, when the first fuel cell unit 110-1 generates power in the heating mode, the output lower than that in the defrost mode is maintained until the cold start of the first fuel cell unit 110-1 is completed. In order to determine the completion of the cold start of the first fuel cell unit 110-1, the coolant temperature of the first fuel cell unit 110-1 needs to reach a predetermined temperature. When the first fuel cell unit 110-1 starts generating power in the defrost mode in section A of the graph, the coolant temperature of the first fuel cell unit 110-1 rapidly rises. Then, when the first fuel cell unit 110-1 generates power in the heating mode, as shown in sections B to C of the graph, the coolant temperature of the first fuel cell unit 110-1 gradually rises to reach the temperature at which of the cold start of the first fuel cell unit 110-1 is completed.

In FIG. 7, power is not output from the second fuel cell unit 110-2 in section A in which the first fuel cell unit 110-1 generates power in the defrost mode. However, the power supplied from the first fuel cell unit 110-1 drives the air compressor 112-2 of the second fuel cell unit. By driving the air compressor 112-2 of the second fuel cell unit, the humidifier 113-2 of the second fuel cell unit is defrosted. Thereafter, when the first fuel cell unit 110-1 generates power in the heating mode, the second fuel cell unit 110-2 starts power generation in the defrost mode. As shown in section B of the graph, the second fuel cell unit 110-2 generates power in the defrost mode and outputs maximum power. Thereafter, in section C, when the defrosting of the second fuel cell unit 110-2 is completed, the heating mode is started and the output lower than that in the defrost mode is maintained until the cold start of the second fuel cell unit 110-2 is completed. When the first fuel cell unit 110-1 generates power in the defrost mode, the coolant temperature of the second fuel cell unit 110-2 maintains an initial state, and when the second fuel cell unit 110-2 generates power in the defrost mode, the coolant temperature of the second fuel cell unit 110-2 rapidly rises. At this time, by using the power provided from the first fuel cell unit 110-1 to drive the air compressor 112-2 of the second fuel cell unit, the coolant temperature of the second fuel cell unit 110-2 reaches the cold start completion temperature quickly, unlike the first fuel cell unit 110-1. According to the graphs of FIGS. 6 to 7, the power generated by the first fuel cell unit 110-1 is supplied to the air compressor 112-2 of the second fuel cell unit, so that the cold start time of the second fuel cell unit 110-2 is shortened.

Meanwhile, FIG. 8 is a flowchart of a control method of a multi-fuel cell system according to an embodiment of the present disclosure. The control method of the multi-fuel cell system 100 of the present disclosure includes the steps of causing the first fuel cell unit of the plurality of electrically connected fuel cell units to generate power in a defrost mode by the controller 130 when the plurality of fuel cell units 110, 110a, 110b, . . . , 110n is cold-started (S200); driving the air compressor of the second fuel cell unit by providing the power generated by the first fuel cell unit 110-1 to the second fuel cell unit 110-2, which is another fuel cell unit, to by the controller 130 (S300); and causing the first fuel cell unit to generate power in the heating mode and the second fuel cell unit to generate power in the defrost mode by the controller when the defrosting of the first fuel cell unit 110-1 is completed (S500 and S600).

When the multi-fuel cell system 100 enters the cold start stage (S100), the controller 130 controls the plurality of fuel cell units 110, 110a, 110b, . . . , 110n to sequentially enter the cold start stage. The controller 130 causes the first fuel cell unit 110-1, which is one of the plurality of fuel cell units 110, 110a, 110b, . . . , 110n, to enter the cold start stage, and the first fuel cell unit 110-1 to generate power in the defrost mode. In the step of causing the first fuel cell unit to generate power in the defrost mode (S200), power is output due to the power generation of the first fuel cell unit 110-1. The controller 130 drives the air compressor 112-1 of the first fuel cell unit with the generated power to supply air to the fuel cell 111-1 of the first fuel cell unit. In the fuel cell 111-1 of the first fuel cell unit, power is generated until the first fuel cell unit 110-1 is defrosted due to a chemical reaction between the supplied air and hydrogen. At this time, if the defrost mode of the first fuel cell unit 110-1 continues, power is continuously generated accordingly. After that, when the other fuel cell units 110 repeat the same process, a large amount of power is generated. However, there is a problem in that the charging performance of the high voltage battery 140 is deteriorated in a low temperature or cryogenic environment, so that the generated power is consumed by a resistor, rather than being used. This has a problem in that the plurality of fuel cell units 110, 110a, 110b, . . . , 110n consumes fuel inefficiently when entering the cold start stage and the efficiency of the cold start decreases. Accordingly, the controller 130 needs to provide a portion of the power generated by the first fuel cell unit 110-1 to the second fuel cell unit 110-2.

The controller 130 operates the converter 120 connected to the first fuel cell unit 110-1 in a buck mode to provide the power generated by the first fuel cell unit 110-1 to the second fuel cell unit 110-2. In addition, the controller 130 operates the converter 120 connected to the second fuel cell unit 110-2 in a boost mode and uses the power provided to the second fuel cell unit 110-2 to drive the air compressor 112-2 of the second fuel cell unit. The controller 130 provides a portion of the power generated by the first fuel cell unit 110-1 to the second fuel cell unit 110-2 to drive the air compressor of the second fuel cell unit (S300). However, when the power generated by the first fuel cell unit 110-1 is provided to the second fuel cell unit 110-2, the controller 130 prevents the power from being transmitted to the fuel cell 111-2 of the second fuel cell unit. When the power generated by the first fuel cell unit 110-1 is provided to the fuel cell 111-2 of the second fuel cell unit, there is a problem in that a reverse current is generated in the fuel cell 111-2 of the second fuel cell unit. Since this may damage the fuel cell 111-2 of the second fuel cell unit or the plurality of electrically connected fuel cell units 110, 110a, 110b, . . . , 110n, the controller 130 needs to prevent the power generated in the first fuel cell unit 110-1 from being provided to the fuel cell 111-2 of the second fuel cell unit.

In the step of driving the air compressor of the second fuel cell unit (S300), the controller 130 drives the air compressor 112-2 of the second fuel cell unit with the power provided from the first fuel cell unit 110-1, thereby defrosting the humidifier 113-2 of the second fuel cell unit. When the power generated by the first fuel cell unit 110-1 is consumed by the first fuel cell unit 110-1, there is a problem of inefficiently consuming power. When the multi-fuel cell system 100 enters the cold start step (S100), the plurality of fuel cell units 110, 110*a*, 110*b*, . . . , 110*n* sequentially enters the cold start, and upon completion of the cold start of the first fuel cell unit 110-1, the second fuel cell unit 110-2 enters the cold start. Accordingly, the controller 130 provides the power generated by the first fuel cell unit 110-1 to the second fuel cell unit 110-2 that is before entering the cold start stage. Accordingly, the controller 130 defrosts the humidifier 113-2 of the second fuel cell unit through the step of driving the air compressor 112-2 of the second fuel cell unit. By defrosting the humidifier 113-2 of the second fuel cell unit in advance, there is an effect of reducing the cold start completion time of the second fuel cell unit 110-2 when the second fuel cell unit 110-2 enters the cold start stage.

Thereafter, the controller 130 determines whether the defrosting of the first fuel cell unit is completed (S400). If the defrosting of the first fuel cell unit 110-1 is completed, the next step proceeds. If the defrosting is not completed, the first fuel cell unit 110-1 generates power in the defrost mode until the defrosting is completed. When the defrosting of the first fuel cell unit 110-1 is completed, the controller 130 proceeds the step of causing the first fuel cell unit to generate power in the heating mode (S500) and the step (S600) of causing the second fuel cell unit to generate power in the defrost mode (S600). In the step (S500) of causing the first fuel cell unit to generate power in the heating mode, the output is lower than that in the defrost mode of the first fuel cell unit 110-1, so that the generated power cannot be provided to the second fuel cell unit 110-2. Accordingly, in the step (S500) of causing the first fuel cell unit to generate power in the heating mode, the controller 130 purposes to complete the cold start of the first fuel cell unit 110-1 by driving the air compressor 112-1 of the first fuel cell unit to cause the first fuel cell unit 110-1 to generate power.

In the step (S600) of causing the second fuel cell unit to generate power in the defrost mode, the same progress as in the step in which the first fuel cell unit 110-1 generates power in the defrost mode is performed. The controller 130 operates the converter 120 connected to the second fuel cell unit 110-2 in a buck mode to provide the power generated by the second fuel cell unit 110-2 to another fuel cell unit. The power generated by the second fuel cell unit 110-2 generating power in the defrost mode is transmitted to the next fuel cell unit 110, and is provided to drive the air compressor 112 of the fuel cell unit in advance before the fuel cell unit 110 enters the cold start stage. In addition, the power generated by the second fuel cell unit 110-2 may be provided to the first fuel cell unit 110-1 that generates power in the heating mode. When the second fuel cell unit 110-2 generates power in the defrost mode, power is generated and output until the second fuel cell unit 110-2 is defrosted to a certain level. When the power generated by the second fuel cell unit 110-2 is transmitted only to the air compressor 112 of the fuel cell unit, there is a risk that the air compressor 112 of the fuel cell unit is overloaded. Therefore, in order to prevent overload of the air compressor 112 of the fuel cell unit, the controller 130 needs to transmit the power generated by the second fuel cell unit 110-2 not only to the air compressor 112 of the fuel cell unit, but also to the first fuel cell unit 110-1 generating power in the heating mode.

According to the multi-fuel cell system and control method thereof of the present disclosure, when a plurality of fuel cell units enters cold start stage, the power output from one of the fuel cell units is used to drive the air compressor of another electrically connected fuel cell unit to defrost the humidifier of the fuel cell unit in advance, so that excessive output when the fuel cell unit enters the cold start can be prevented and the cold start completion time can be shortened.

In addition, by using the power generated from one fuel cell unit to defrost the humidifier of another electrically connected fuel cell unit before entering the cold start, stable cold-start performance can be secured even if the charging efficiency is reduced due to the degradation of the high voltage battery in a low temperature or cryogenic environment.

Although shown and described in relation to specific embodiments of the present disclosure, it will be apparent to those of ordinary skill in the art that the present disclosure can be variously improved and changed without departing from the spirit of the present disclosure provided by the following claims.

What is claimed is:

1. A multi-fuel cell system, comprising:
a plurality of fuel cell units electrically connected to each other and each including a fuel cell, an air compressor, and a humidifier; and
a controller that causes a first fuel cell unit, one of the plurality of fuel cell units, to generate power in a defrost mode when the plurality of fuel cell units is cold-started, drives an air compressor of a second fuel cell unit, another fuel cell unit, by providing power generated by the first fuel cell unit to the second fuel cell unit, and causes the first fuel cell unit to generate power in a heating mode and the second fuel cell unit to generate power in the defrost mode when a defrosting of the first fuel cell unit is completed.

2. The multi-fuel cell system according to claim 1, wherein the controller causes the fuel cell unit to generate a higher output in the defrost mode than in the heating mode.

3. The multi-fuel cell system according to claim 1, wherein the humidifier of the fuel cell unit introduces air from the air compressor through an air inlet line, supplies the air to the fuel cell through an air supply line, introduces air after reaction from the fuel cell through an air recovery line, and discharges the air to an outside through an exhaust line.

4. The multi-fuel cell system according to claim 3, wherein a bypass line connecting the air supply line and the air recovery line is provided, and a three-way valve is provided at a point where the air supply line and the bypass line intersect.

5. The multi-fuel cell system according to claim 4, wherein when the first fuel cell unit generates power in the defrost mode or the heating mode, the controller causes the three-way valve to close the bypass line, and when the air compressor of the second fuel cell unit is driven, the controller causes the three-way valve to open the closed bypass line so that the air is not supplied to the fuel cell.

6. The multi-fuel cell system according to claim 4, wherein when the air compressor of the second fuel cell unit is driven, the air introduced to the humidifier through the air inlet line is supplied through the air supply line, moves to the bypass line without being supplied to the fuel cell due to the three-way valve, and is transmitted back to the humidifier through the air recovery line.

7. A control method of a multi-fuel cell system, comprising the steps of:
causing a first fuel cell unit, one of a plurality of electrically connected fuel cell units, to generate power in a defrost mode by a controller when the plurality of electrically connected fuel cell units is cold-started;

driving an air compressor of a second fuel cell unit, another fuel cell unit, by providing power generated by the first fuel cell unit to the second fuel cell unit, by the controller; and causing the first fuel cell unit to generate power in a heating mode and the second fuel cell unit to generate power in the defrost mode by the controller when a defrosting of the first fuel cell unit is completed.

8. The control method of a multi-fuel cell system according to claim 7, wherein in the step of causing the first fuel cell unit to generate power in the defrost mode, the controller supplies air to a fuel cell of the first fuel cell unit by driving an air compressor of the first fuel cell unit using the power generated by the first fuel cell unit.

9. The control method of a multi-fuel cell system according to claim 7, wherein in the step of causing the first fuel cell unit to generate power in the defrost mode, when the power generated by the first fuel cell unit is provided to the second fuel cell unit, the controller operates a converter connected to the first fuel cell unit in a buck mode.

10. The control method of a multi-fuel cell system according to claim 7, wherein in the step of driving the air compressor of the second fuel cell unit, when the power generated by the first fuel cell unit is provided to the second fuel cell unit, the controller operates a converter connected to the second fuel cell unit in a boost mode.

11. The control method of a multi-fuel cell system according to claim 7, wherein in the step of driving the air compressor of the second fuel cell unit, the controller does not transmit the power provided from the first fuel cell unit to a fuel cell of the second fuel cell unit.

12. The control method of a multi-fuel cell system according to claim 7, wherein in the step of driving the air compressor of the second fuel cell unit, the controller drives the air compressor of the second fuel cell unit with the power supplied from the first fuel cell unit to defrost a humidifier of the second fuel cell unit.

13. The control method of a multi-fuel cell system according to claim 7, wherein in the step of causing the second fuel cell unit to generate power in the defrost mode, the controller provides the power generated by the second fuel cell unit to the air compressor of the first fuel cell unit that generates power in the heating mode.

\* \* \* \* \*